United States Patent
Perevalov et al.

(10) Patent No.: US 11,067,521 B2
(45) Date of Patent: Jul. 20, 2021

(54) APPARATUS AND METHODS FOR MEASURING THERMAL TRANSFORMATION

(71) Applicants: ANV LASER INDUSTRY LTD., Petach Tikva (IL); SCIFEAT LTD., Rosh Haayin (IL)

(72) Inventors: Valery Perevalov, Kfar Saba (IL); Boris Temkin, Rosh Haayin (IL)

(73) Assignees: ANV LASER INDUSTRY LTD., Petach Tikva (IL); SCIFEAT LTD., Rosh Haayin (IL)

( * ) Notice: Subject to any disclaimer, the term of this patent is extended or adjusted under 35 U.S.C. 154(b) by 337 days.

(21) Appl. No.: 16/132,467

(22) Filed: Sep. 17, 2018

(65) Prior Publication Data

US 2019/0086347 A1 Mar. 21, 2019

Related U.S. Application Data

(60) Provisional application No. 62/559,607, filed on Sep. 17, 2017.

(51) Int. Cl.
| | |
|---|---|
| *G01N 25/02* | (2006.01) |
| *G01K 1/00* | (2006.01) |
| *G01K 11/00* | (2006.01) |
| *G01N 25/48* | (2006.01) |
| *G05D 23/22* | (2006.01) |
| *G01N 25/18* | (2006.01) |

(52) U.S. Cl.
CPC ......... *G01N 25/4866* (2013.01); *G01N 25/18* (2013.01); *G05D 23/22* (2013.01)

(58) Field of Classification Search
USPC ........................................ 374/16, 141, 208
See application file for complete search history.

(56) References Cited

U.S. PATENT DOCUMENTS

| | | | | |
|---|---|---|---|---|
| 5,088,833 | A * | 2/1992 | Tsang ................. | G01N 33/2811 374/17 |
| 6,536,944 | B1 * | 3/2003 | Archibald ............ | B01J 19/0046 219/497 |
| 2009/0190626 | A1 * | 7/2009 | Bradley ................. | G01N 25/04 374/16 |

OTHER PUBLICATIONS

M. Bartning and J. Simpson, Design and Performance of a Non-Contact Af Tester, SMST 2003: Proceedings of the International Conference on Shape Memory and Superelastic Technologies, Alan R. Felton and Tom Duerig, Editors, 2004, pp. 53-58, Published by: SMST Society, Inc., California USA, ISBN 0-9660508-3-5.

Standard Test Method for Determination of Transformation Temperature of Nickel-Titanium Shape Memory Alloys by Bend and Free Recovery, Designation: ASTM F2082/F2082M-16, Standard by ASTM International, Oct. 5, 2016, pp. 1-8.

* cited by examiner

*Primary Examiner* — Mirellys Jagan
(74) *Attorney, Agent, or Firm* — The Roy Gross Law Firm, LLC; Roy Gross

(57) ABSTRACT

The present application discloses, in some embodiments thereof, an apparatus, systems and methods for measuring specimens' displacement or transformation while heating. In some embodiments, the present invention discloses apparatus and methods for determining the transformation temperature or range of temperatures of specimens, such as specimens manufactured from a memory shape alloy.

20 Claims, 6 Drawing Sheets

APPARATUS AND METHODS FOR MEASURING THERMAL TRANSFORMATION

FIELD OF THE INVENTION

The present application discloses, in some embodiments thereof, apparatus, systems and methods for measuring specimens' displacement or transformation relative to temperature. In some embodiments, the present invention discloses apparatus and methods for determining the transformation temperature or range of temperatures of specimens, such as, specimens manufactured from a memory shape alloy.

BACKGROUND OF THE INVENTION

Materials, capable of possessing shape memory are well known. Devices manufactured from such materials can be deformed from an original, heat-stable configuration to a heat-unstable configuration. Such devices possess 'shape memory' since, upon application of heat, they recover their original heat stable configuration. Several types of alloys possess shape memory and undergo a reversible transformation from an austenitic state to a martensitic state with a change of temperature. Also, the alloy is considerably stronger in its austenitic state than in its martensitic state. This transformation is sometimes referred to as a 'thermoelastic martensitic transformation'. A device made from such alloy, is readily deformed from its martensitic configuration to its austenitic configuration when heated. The temperature at which this transformation begins is usually referred to as and the temperature at which it finishes is $A_f$. Commercially viable alloys of nickel and titanium have been demonstrated to have shape-memory properties which render them highly useful in a variety of applications.

Many devices made from a shape memory material, especially those manufactured for medical applications, require an accurate measurement and data regarding their shape recovery properties. A commonly used method for determining the martensite to austenite transformation temperature, uses a displacement transducer (linear variable differential transducer; i.e., LVDT or rotary variable differential transducer; i.e., RVDT) to plot the displacement of the specimen vs. temperature. A displacement transducer is set to contact or exert pressure on the specimen while the specimen is heated, and displacement is recorded vs. temperature. The most predominant drawback of this method is associated with the force exerted by the transducer on the specimen which may affect motion and consequently provide in-accurate transformation temperature measurements. Additional drawback is associated with geometry difficulties in fixturing the specimen, and the limited specimen's size over which the transducer can effectively measure displacement. Other known methods utilize heat/stir plates for heating and visualization systems that record motion of a tested object upon heating. An output measurement of pixels is produced and further processed to provide a plot of displacement vs. temperature. Such methods typically face difficulties associated with low resolution images due to both lighting and imaging the object from above, causing light reflection and producing low contrast images.

There is thus a need for accurate and a reliable methods and apparatus for evaluating the transition temperature of shape memory devices.

SUMMARY OF THE INVENTION

The present invention discloses, in some embodiments thereof, apparatus, systems and methods for measuring specimens' displacement relative to change in temperature. In some embodiments, the present invention discloses apparatus and methods of determining the transformation or transition temperature or range of temperatures of specimens such as shape memory materials, for example shape memory alloys.

An important part of developing novel shape memory alloy articles, especially articles for medical applications, is evaluation of the deformation properties underlying such articles.

A typical procedure commonly used for evaluating transition temperature utilizes probe transducers that contact or exert load on specimens while measuring displacement vs. increase in temperature. Such methods may present inaccurate measurements for small specimens or specimens with complex structures. Other known non-contact methods may suffer from low quality images associated with the position of both the lighting lamp and imaging system above the tested specimen.

The present invention, in some embodiments thereof, discloses a non-contact method and apparatus of measuring the transition temperature of small specimens or specimens with complex structures utilizing a camera that records specimens' displacement upon heating. The invention is based in part on the discovery that high quality images and accurate measurements of specimens undergoing transformation during heating may be obtained when locating the specimen between the imager and the lights source. Utilizing a heater, below the specimen, that is at least partially transparent or translucent and allows passage of light therethrough affords such setting. In some embodiments, such a heater affords well illumination of the specimens. The inventors discovered that such settings enable recording images with less reflection and/or can produce accurate transformation temperatures.

The invention thus provides, according to one aspect, an apparatus for measuring the phase transition temperature of one or more specimens, the apparatus comprising a container for accommodating one or more specimens;

at least one light source for illuminating the one or more specimens;

an imager configured to capture one or more images; and a heater that is at least partially transparent or translucent located on a line of sight between the at least one light source and the imager, the heater configured to heat the one or more specimens in the container.

According to another aspect, the invention provides an apparatus for measuring displacement of one or specimens, the apparatus comprising a container for accommodating one or more specimens;

at least one light source for illuminating the one or more specimens;

a heater configured to heat the one or more specimens, the heater is at least partially transparent or translucent such to allow illumination of the one or more specimens by the light source through the heater; and an imager configured to capture one or more images while heating the one or more specimens.

According to another aspect, the invention provides an apparatus for measuring displacement of a specimen, the apparatus comprising a container for hosting and/or holding said specimen;

a heater configured to heat the specimen within the container;

at least one light source for illuminating the one or more specimens; and an imager configured to capture images of the specimens upon heating, wherein the heater allows passage of light therethrough such that the specimen may be illuminated from light derived from the light source that passes through the heater.

According to another aspect, the present invention provides an apparatus for measuring motion of a specimen while raising temperature, the apparatus comprising a heater configured to heat the specimen within the apparatus;

a light source for illuminating the specimen; and an imager configured to capture images of the specimen while heating, wherein the heater is at least partially transparent or translucent and located on a line of sight between the at least one light source and the imager, the heater configured to heat the one or more specimens in the container.

According to yet another aspect, the present invention provides an apparatus for measuring an area or change in area, or change in shape, or change in structure, or change in motion of a specimen while raising temperature, the apparatus comprising a heater configured to heat the specimen within the apparatus;

a light source for illuminating the specimen; and an imager configured to capture images of the specimen while heating, wherein the heater is at least partially transparent or translucent and located on a line of sight between the at least one light source and the imager, the heater configured to heat the one or more specimens in the container.

According to yet another aspect, the present invention provides an apparatus for measuring an area or change in area or displacement of a specimen versus change in temperature, the apparatus comprising a heater configured to heat the specimen within the apparatus;

a light source for illuminating the specimen; and an imager configured to capture images of the specimen while heating, wherein the light source and the imager are positioned such that an angle of about 100 degrees to about 260 degrees resides between a line of sight of, or a plain between, the imager to the container and/or heater and/or specimen and a line of sight of, or a plain between, the light source to the container, and/or heater and/or specimen.

According to some embodiments, the invention is useful for determining the transformation temperature or range of temperatures of said specimen. According to some embodiments, the invention is useful for determining the phase transition temperature of one or specimens.

According to some embodiments, the invention is useful in determining the transformation temperature or range of temperatures of a shape memory alloy specimen.

According to some embodiments, the invention is useful in determining the martensite to austenite transformation temperature or range of temperatures of a nickel titanium alloy specimen.

According to some embodiments, the heater is disposed below the one or more specimens and between the light source and the imager.

According to some embodiments, the heater is disposed below the one or more specimens, the light source above the one or more specimens, and the imager disposed below the heater.

According to some embodiments, the heater is disposed below the one or more specimens and the light source positioned below the heater such to allow illuminating the one or more specimens from below through the heater. According to some embodiments, the heater is disposed below the one or more specimens, the light source positioned below the heater, and the imager above the one or more specimens, such to allow illuminating the one or more specimens from below through the heater.

According to some embodiments, an angle of about 100 degrees to about 260 degrees resides between a single plain between the imager and the container, and/or heater, and/or specimen and a single plain between the light source and the container, and/or specimen, and/or heater.

According to some embodiments, an angle of about 100 degrees to about 180 degrees resides between a single plain between the imager and the container and/or specimen and/or heater and a single plain between the light source and the container, and/or specimen, and/or heater.

According to some embodiments, an angle of about 180 degrees resides between a single plain between the imager and the container, and/or specimen and/or heater and a single plain between the light source and the container, and/or specimen, and/or heater.

According to some embodiments, an angle of about 100 degrees to about 260 degrees resides between a line of sight of the imager to the container, and/or heater, and/or specimen and a line of sight of the light source to the container, and/or heater and/or specimen.

According to some embodiments, an angle of about 100 degrees to about 180 degrees resides between a line of sight of the imager to the container, and/or heater, and/or specimen and a line of sight of the light source to the container and/or heater, and/or specimen.

According to some embodiments, an angle of about 180 degrees resides between a line of sight of the imager to the container, and/or specimen, and/or heater and a line of sight of the light source to the container, and/or specimen, and/or heater.

According to some embodiments, the container, the heater, the light source, and the imager are disposed in a closed chamber.

According to some embodiments, the heater is disposed below the container.

According to some embodiments, the imager is disposed above or below the container.

According to some embodiments, the imager is disposed above or below the container and the light source and the imager are positioned such that an angle of about 180 degrees resides between a line of sight of the imager to the specimen and a line of sight of the light source to the specimen.

According to some embodiments, the heater is transparent, semi-transparent or partially transparent.

According to some embodiments, the container is transparent, semi-transparent or partially transparent.

According to some embodiments, the container is configured to contain a fluid having a freezing point below about 0° C. and a boiling temperature above about 50° C.

According to some embodiments, the heater is manufactured from a glass coated with a conductive film.

According to some embodiments, the conductive film comprises indium tin oxide (ITO).

According to some embodiments, the conductive film is transparent, substantially transparent, semi-transparent, or at least partially transparent.

According to some embodiments, the heater is configured to gradually heat the specimen at a rate of about 0.5° C./minute or above. According to some embodiments, the heater is configured to gradually heat the specimen at a rate of about 1° C./minute or more. According to some embodiments, the heater is configured to gradually heat the specimen at a rate within the range of about 0.5° C./minute to about 6° C./minute. According to some embodiments, the heater is configured to gradually heat the specimen at a rate within the range of about 1° C./minute to about 4° C./minute.

According to some embodiments, the light source comprises one or more diffuse lamps.

According to some embodiments, the diffuse lamps comprise one or more led lamps.

According to some embodiments, the apparatus further comprises a temperature sensor for indicating the temperature within the chamber. According to some embodiments, the apparatus further comprises a temperature sensor for indicating the temperature of the specimen.

According to some embodiments, the apparatus further comprises a temperature sensor for indicating the temperature within the container.

According to some embodiments, the imager comprises a digital camera configured to provide an output measurement of the captured images.

According to some embodiments, the apparatus, further comprises a data acquisition system. According to some embodiments, the apparatus, further comprises a computer with a data acquisition system, the computer is configured to analyze said output and produce data regarding displacement or change in area relative to temperature of said specimen.

According to some embodiments, the specimen is selected from the group consisting of a wire, a tube a strip. According to some embodiments, the specimen is a structure comprising one or more wires, and/or strips.

According to some embodiments, the apparatus is capable of producing an accurate displacement measurement for specimen having weight less than 3 grams. According to some embodiments, the apparatus is capable of producing an accurate displacement measurement for specimen having a diameter less than 0.5 mm, or less than 0.4 mm, or less than 0.3 mm.

According to yet another aspect, the invention provides a method for measuring displacement of one or specimens, the method comprising the steps of providing one or more specimens within a container;

heating the one or more specimens using a heater that is at least partially transparent or translucent;

illuminating said specimen(s) using at least one light source;

capturing images of said specimen(s) using an imager; and evaluating displacement of said specimen(s) relative to temperature elevation.

According to yet another aspect, the invention provides a method for measuring displacement of one or specimens, the method comprising the steps of providing one or more specimens within a container;

heating the one or more specimens using a heater that is at least partially transparent or translucent;

illuminating said specimen(s) by shining a light that can pass through the heater;

capturing images of the specimen(s), while heating, using an imager; and evaluating displacement of said specimen(s) relative to temperature elevation.

According to yet another aspect, the invention provides a method for measuring or detecting displacement of a specimen while raising the temperature, the method comprising the steps of heating the one or more specimens using a heater;

illuminating said specimen(s) using a light source;

capturing images of said specimen(s), while heating, using an imager; and evaluating motion of said specimen(s) relative to temperature, wherein the heater allows passage of light therethrough such that the specimen(s) may be illuminated from light derived from the light source.

According to some embodiments, the method is useful in determining the transformation temperature or range of temperatures of said specimen.

According to some embodiments, the method is useful in determining the transformation temperature or range of temperatures of a shape memory alloy specimen.

According to some embodiments, the method is useful in determining the martensite to austenite transformation temperature or range of temperatures of a nickel titanium alloy specimen.

According to some embodiments, the method further comprises cooling the specimen(s) prior to the measurement or detection.

According to some embodiments, the method further comprises deforming the specimen prior to heating.

According to some embodiments, the specimen is cooled at least until it reaches its martensitic phase.

According to some embodiments, heating is performed at least until the specimen reaches its austenite phase.

According to some embodiments, the method comprises placing the imager and the light source such that an angle of about 100 degrees to about 260 degrees resides between a line of sight of the imager to the container, and/or specimen, and/or heater and a line of sight of the light source to the container, and/or specimen, and/or heater.

According to some embodiments, the method comprises placing the container, the heater, the light source, the one or more specimens and the imager in a closed chamber.

According to some embodiments, the heater is transparent, semi-transparent or partially transparent.

According to some embodiments, the heater is manufactured from a glass coated with a conductive film.

According to some embodiments, heating is performed gradually at a rate of about 0.5° C./minute or above. According to some embodiments, heating is performed at a rate of about 1° C./minute or more. According to some embodiments, heating is performed at a rate within the range of about 0.5° C./minute to about 6° C./minute. According to some embodiments, heating is performed at a rate within the range of about 1° C./minute to about 4° C./minute.

According to some embodiments, the method further comprises detecting the temperature while measuring or detecting motion, displacement or change in area of the specimen, using a temperature sensor for indicating the temperature within the chamber or of the specimen.

According to some embodiments, the method further comprises providing an output measurement of the captured images.

According to some embodiments, the method further comprises analyzing the output measurement and producing a data regarding the transformation temperature or range of temperatures of the specimen. According to some embodiments, analyzing is conducted using a data acquisition system.

According to some embodiments, the specimen is selected from the group consisting of a wire, a tube a strip.

According to some embodiments, the specimen is a structure comprising one or more wires, and/or strips.

According to some embodiments, the method is capable of producing an accurate motion measurement for specimen having weight less than 3 grams.

Unless otherwise defined, all technical or/and scientific terms used herein have the same meaning as commonly understood by one of ordinary skill in the art to which the invention pertains. Although methods and materials similar or equivalent to those described herein can be used in the practice or testing of embodiments of the invention, exemplary methods or/and materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

Figure 1:
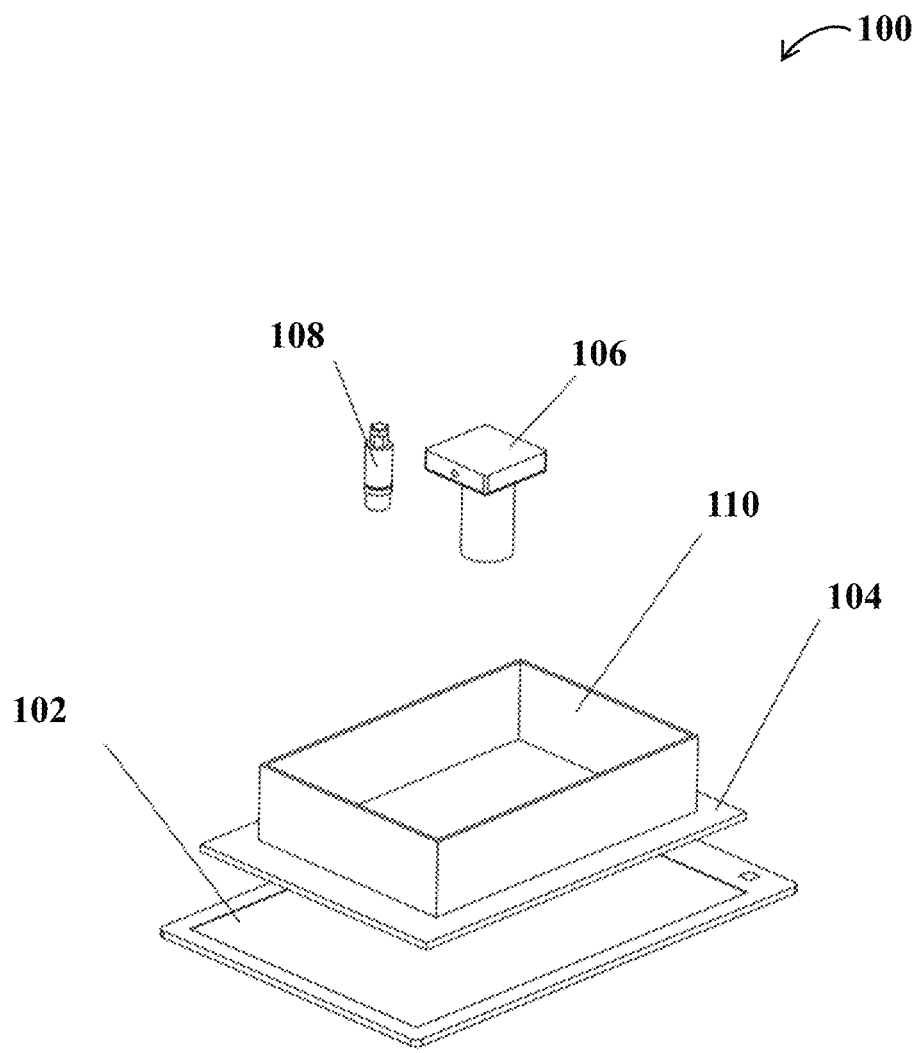
FIG. 1 is a schematic presentation of an apparatus for measuring displacement or transition temperature of a specimen, according to some embodiments of the invention.

It should be appreciated that for simplicity and clarity of illustration, elements shown in the figures have not necessarily been drawn to scale. For example, the dimensions of some of the elements are exaggerated relative to each other for clarity. Further, where considered appropriate, reference numerals have been repeated among the figures to indicate corresponding elements.

DETAILED DESCRIPTION OF THE INVENTION

It is understood that the invention is not limited to the particular methodology, protocols, etc., described herein, as these may vary as the skilled artisan will recognize. It is also to be understood that the terminology used herein is used for the purpose of describing particular embodiments only, and is not intended to limit the scope of the invention. The invention is not limited to the specifically described apparatus, and methods, and may be adapted to various applications without departing from the overall scope of the invention. All ranges disclosed herein include the endpoints. The use of the term "or" shall be construed to mean "and/or" unless the specific context indicates otherwise.

The present invention, in some embodiments thereof, relates to apparatus, systems and methods for recording motion of a specimen or a plurality of specimens upon changing temperature. More particularly, but not exclusively, the invention relates to apparatus, systems and methods for recording motion of a specimen or a plurality of specimens while heating. According to some embodiments, the invention affords determination of the transformation or transition temperature of a specimen or plurality of specimens. According to some embodiments, the invention affords determining the austenite start temperature "$A_s$," and austenite finish temperature "$A_f$" of a specimen. According to some embodiments, the invention affords determining the martensite start temperature (i.e., $M_s$ and martensite finish temperature (i.e., $M_f$). According to some embodiments, the invention provides apparatus and methods of measuring area or change in area, or change in shape a specimen occupies relative to temperature or increase in temperature. Optionally, the device measures a change in the geometric structure of a specimen.

The invention, in some embodiments thereof, is based in part on the discovery that specimens may be accurately analyzed, without contacting the specimen with a transducer, by placing a specimen between an imager and a light source. Optionally, motion of the specimens is recorded and/or tested while heating. The invention, in some embodiments thereof, further overcomes problems of light reflection and poor contrast images associated with known non-contact methods. For example, a heater that affords passage of light therethrough facilitates good illumination of a tested specimen and/or good quality images of the transformed specimen. The specimen may be illuminated by a light source emitting light that passes through the heater. Images are optionally captured by an imager positioned opposite or against the light source. The imager optionally collects high quality images of the specimen while the specimen is being heated. The images may be processed by a data acquisition program, for example running on a PC. Output may include a plotted curve of the area or shape vs. temperature.

The novel apparatus and methods of the invention, in some embodiments thereof, afford analysis of small and/or complexed geometry articles, and/or provides accurate and reliable analysis results, and/or is user friendly and may be fast performing.

In one or more embodiments, the location of the imager with respect to the light source allows for the high quality imager and accurate measurements as herein described. In one or more embodiments, the heater and specimen are located between the imager and the light source.

In one or more embodiments, an angle of about 100 degrees to about 260 degrees resides between a plain between the imager and the heater, and/or specimen and a plain between the light source and the specimen, and/or heater. For example, an angle of about 110 degrees to about 250 degrees, about 120 degrees to about 240 degrees, about 130 degrees to about 230 degrees, about 140 degrees to about 220 degrees, about 150 degrees to about 210 degrees, about 160 degrees to about 200 degrees, about 100 degrees to about 180 degrees, about 110 degrees to about 180 degrees, about 120 degrees to about 180 degrees, about 130 degrees to about 180 degrees, about 140 degrees to about 180 degrees, about 150 degrees to about 180 degrees, or about 170 degrees to about 240 degrees, resides between a plain between the imager and the heater, and/or specimen and a plain between the light source and the specimen, and/or heater.

According to some embodiments, a single specimen may be analyzed by the apparatus and methods of the invention. According to some embodiments, a plurality of specimens may be analyzed in parallel. According to some embodiments, plurality of specimens means two or more specimens. For example, three or more, four or more, or five or more specimens. According to some embodiments, plurality of specimens means 2 to 100, 2 to 90, 2 to 80, 2 to 70, 2 to 60, 2 to 50, 2 to 40, 2 to 30, 2 to 20, 2 to 10, 2 to 9, 2 to 8, 2 to 7, 2 to 6, or 2 to 5 specimens.

According to some embodiment, the herein disclosed methods and apparatus are particularly useful for determining the transition temperature of shape memory alloys.

As used herein the term "shape memory alloy" (SMA) refers to an alloy that displays thermoelastic martensitic transformation property. This property is defined as the ability to undergo a reversible transformation from an Austenite to a Martensite with a change in temperature such that an article made from such alloy has a heat stable configuration and is capable of being deformed to a heat unstable position.

According to one embodiment, the shape memory alloy comprises nickel-titanium (a.k.a. NiTi, nitinol). The shape memory alloy may comprise other metals, for example, the shape memory alloy may be an iron-based or a copper-based alloy. Further suitable shape memory alloys according to some embodiments of the present invention include, but are not limited to, ternary or quaternary alloy (e.g. copper-aluminum-nickel). The SMA may comprise a combination of at least two metals selected from: zinc, copper, gold, iron, titanium and nickel. The SMA may be based on NiTi alloy and may further include one or more additional alloying elements, including, but not limited to Al, Ag, Au, Cu, Fe, Ga, Ir, Nb, Pd, Pt, Rh, Ta5 or W.

As used herein the term "Austenitic state" refers to the stronger, higher temperature phase (crystal structure) present in a shape-memory alloy. Austenite start temperature "$A_s$" refers to the temperature at which a shape memory alloy starts transforming martensite to austenite upon heating. "Austenite finish temperature "$A_f$" refers to the temperature at which a shape memory alloy finishes transforming martensite to austenite upon heating. According to some embodiments, the transition temperature is an $A_f$ temperature.

As used herein the term "Martensitic state" refers to the more deformable, lower temperature phase (crystal structure) present in a shape-memory alloy. $M_s$ and $M_f$ are the temperatures at which the transition to martensite starts and finishes upon cooling, respectively.

As used herein the term "one way shape-memory alloy" means that in the soft state, the alloy is plastic and can be bent, squeezed or stretched and will retain its deformed shape until heated to or above the transition temperature. Upon heating, the shape recovers its original configuration.

As used herein the term "Transition temperature" refers to the temperature at which the material transforms from one state to another state. The term "Transition temperature" is interchangeable with the terms "transformation temperature", and "critical temperature". According to some embodiments, the transition temperature refers to the temperature at which the material transforms from the Martensitic state to the Austenitic state.

As used herein the term "specimen" refers to any structure, material, or device or article that is manufactured from or comprises a material, that can undergo a visual change in response to change in temperature. The term specimen is interchangeable with the term "article" or "device", or "sample". According to some embodiments, the specimen is manufactured from or comprises a shape memory alloy. According to some embodiments, the specimen undergoes thermal transformation at temperatures within the range of between about −50° C. to about 100° C. For example, between about −35° C. to about 95° C., between about −30° C. to about 95° C., between about −10° C. to about 60° C., between about 0° C. to about 50° C., between about 5° C. to about 40° C., between about 5° C. to about 30° C., or between about 5° C. to about 20° C. Each possibility presents a separate embodiment of the invention.

A specimen of the invention may be made of a shape memory material. Devices of shape memory material are transformed below a critical temperature and recover their original shape upon heating above the critical temperature. This effect is so called shape memory effect (SME). The same material can exhibit another property called "superelasticity" (SE). SE is associated with a large recoverable strain upon loading and unloading at a temperature above the critical. For example, a device of shape memory material having an initial shape or configuration may be deformed to a second configuration at or below a particular transition temperature.

According to some embodiments, the specimen comprises two different states (i.e. soft and super-elastic), with possible intermediate structures, shapes or states at temperatures between the $A_s$ and $A_f$ or at temperatures between the $M_s$ and $M_f$.

According to some embodiments, the specimen may be a wire, a tube, a strip. According to some embodiments, the specimen may be a structure comprising one or more wires, and/or strips, and/or tubes. According to some embodiments, the specimen may be a complex structure comprising one or more wires, and/or strips, and/or tubes. According to an exemplary embodiment, the specimen is a stent. According to a further exemplary embodiment, the specimen is a guidewire. According to yet a further exemplary embodiment, the specimen is a sunglass frame.

According to one or more embodiments, the specimen may present various dimensions and weights. Some embodiments of a measuring apparatus provide accurate measurement even to small specimens. For example, the specimen may weigh less than about 10 grams, or less than about 9 grams, or less than about 8 grams, or less than about 7 grams, or less than about 6 grams, or less than about 5 grams, or less than about 4 grams, or less than about 3 grams. The specimen may present a diameter of less than about 2 mm, or 1 mm, or less than about 0.9 mm, or less than about 0.8 mm, or less than about 0.7 mm, or less than about 0.6 mm, or less than about 0.5, or less than about 0.4, or less than about 0.3 mm. For example, the specimen may present a length less than about 20 mm, or less than about 15 mm, or less than about 10 mm.

Reference is now being made to FIG. 1 that illustrates an apparatus 100 in accordance with an embodiment of the invention which comprises light source 102, heater 104, imager 106 and optionally temperature sensor 108. According to some embodiments, apparatus 100 further comprises container 110 at which a specimen or a plurality of specimens may be kept or held. In one or more embodiments, the container is manufactured from at least partially transparent or transparent material such as a glass.

According to some embodiments, light source 102 is configured to illuminate the specimen or plurality of specimens. According to some embodiments, light source 102 is adapted to illuminate the specimen or plurality of specimens. Various types of light source 102 may be used. Non-limiting examples include a halogen lamp, a light-emitting diode (LED) lamp and a laser lamp. According to one or more embodiments, light source 102 is a led lamp. According to one or more embodiments, light source 102 presents a shape of a square or a rectangle as demonstrated in FIG. 1. Nevertheless, various other shapes or structures of light source are contemplated within one or more embodiments of the invention. Further contemplated is several light sources 102 which may be positioned at various locations. For example, apparatus 100 may contain one or more, two or more, three or more, five or more, six or more, seven or more, eight or more, nine or more, or ten or more light sources 102. For example, apparatus 100 may contain between one to ten light sources, between one to nine, between one to eight, between one to seven, between one to six, between one to five, between one to four, between one to three, or two or one light source.

Heater 104 is configured to project or transmit heat towards a specimen (e.g., a specimen located in container 110). Any heater 104 may be used as long as the heater allows passage of light emitted from light source 102. Heater 104 may, for example, comprise a glass plate coated with a conductive material. Exemplary suitable conductive materials include, without limitation, indium tin oxide [ITO]. The conductive material may present the form of a film or a layer. According to some embodiments, heater 104 is manufactured from a flat glass coated with a conductive film. According to some embodiments, the glass presents the form or shape of a square or a rectangle and may be coated on one side or on two sides or on all sides with the conductive material. Heater 104 may be further configured such that the rate of heat can be controlled by a user. According to some embodiments, the heat rate is 1° C. per a minute, or below, or above. For example, the heat rate is 2° C. per a minute, or 3° C. per a minute, or 4° C. per a minute. For example, the heat rate is between 1° C. to 4° C. per a minute, between 1° C. to 2° C. per a minute and/or between 2° C. to 3° C. per a minute and/or between 3° C. to 4° C. per a minute and/or above 4° C. degrees per minute. In one or more embodiments, the heater 104 and the light source 102 are provided as an integral unified, one piece of unit. Alternatively, the heater 104 and the light source 102 are provided as separate units.

According to an exemplary embodiment, the conductive material presents resistance of about 20 Ohms/Sq. For example, between about 1 Ohms/Sq to about 50 Ohms/Sq, between about 5 Ohms/Sq to about 50 Ohms/Sq, about 10 Ohms/Sq to about 50 Ohms/Sq, about 15 Ohms/Sq to about 50 Ohms/Sq, about 20 Ohms/Sq to about 50 Ohms/Sq, about 25 Ohms/Sq to about 50 Ohms/Sq, about 30 Ohms/Sq to about 50 Ohms/Sq, or about 35 Ohms/Sq to about 50 Ohms/Sq. According to an exemplary embodiment, the glass has a length of about 300 mm. For example, about 50 mm to about 500 mm, about 100 mm to about 400 mm, about 150 mm to about 350 mm, or about 200 mm to about 350 mm. According to an exemplary embodiment, the glass has a width of about 200 mm, or about 210 mm. For example, about 50 mm to about 500 mm, about 100 mm to about 400 mm, about 150 mm to about 350 mm, or about 150 mm to about 300 mm. According to some embodiments, the thickness of the glass is within the range of about 1 mm to about 20 mm. For example, about 1 mm to about 15 mm, about 1 mm to about 10 mm, about 1 mm to about 8 mm, about 2 mm to about 7 mm, or about 2 mm to about 5 mm.

According to one or more embodiments, the heater 104 is transparent, or substantially transparent. According to one or more embodiments, the conductive material is transparent, or substantially transparent. According to one or more embodiments, the conductive material is semi-transparent or partially transparent. According to one or more embodiments, the glass is transparent, or substantially transparent. According to one or more embodiments, the glass is semi-transparent or partially transparent. According to some embodiments, the glass and the conductive material are transparent, or substantially transparent.

As used herein the term "transparent" refers to the property of transmitting rays of light through a substance such that subjects situated beyond or behind can be seen. According to some embodiments, the heater 104 is transparent and allows passage of at least about 95% or more of light projected from the light source 102. A transparent and/or substantially transparent and/or semi-transparent material may pass the light with negligent scattering.

As used herein the term "substantially-transparent" takes the meaning of almost transparent. According to some embodiments, the heater 104 is substantially transparent and allows passage of at least about 90%, or between about 90% to about 95% of light projected from the light source 102.

As used herein the term "semi-transparent" is interchangeable with the term "partially transparent" and takes the meaning of imperfectly transparent.

According to some embodiments, the heater is semi-transparent and allows passage of between about 20% to about 90%, or between about 30% to about 90%, or between about 40% to about 90%, or between about 50% to about 90%, or between about 60% to about 90%, or between about 70% to about 90%, or between about 80% to about 90%, of light projected from the light source 102.

Imager 106, may be any vision system capable of recording motion, displacement or change in shape and size of specimens as herein discussed. According to an exemplary embodiment, the imager 106 is a camera configured to capture images of the specimen. According to a further exemplary embodiment, imager 106 uses a laser micrometer technique. The imager 106 may be used or devised to scan and/or image, and/or capture and/or collect images of the specimen while changing the temperature. Optionally, the imager 106 can collect full frame images during a short acquisition time or can utilize raster scanning. The imager may include a charge coupled device (CCD) camera. The imager 106 may include zoom lens to allow a signal for small changes in motion.

According to one or more embodiments, the hereinabove described elements of apparatus 100 may be incorporated within a closed chamber (not shown). A closed chamber may prevent penetration of ambient light.

In one or more embodiments, a temperature sensor 108 is utilized to indicate or detect the temperature of the specimen and/or temperature within the container and/or the temperature of the chamber and/or the temperature of a fluid in the chamber contacting the specimen. A "temperature sensor" may include "a thermocouple". Various temperature sensors may be utilized. According to one or more embodiments, the temperature sensor includes a thermocouple selected from the group consisting of: Nickel-alloy thermocouple, Platinum/rhodium-alloy thermocouples, Tungsten/rhenium-alloy thermocouples, Chromel-gold/iron-alloy thermocouples, Platinum/molybdenum-alloy thermocouples, Iridium/rhodium alloy thermocouples, Pure noble-metal thermocouples Au—Pt, Pt—Pd, and Skutterudite thermocouple.

Container 110 is configured to house the specimen and may be any suitable container as long as it allows heat convection or transfer from heater 104. In some embodiments, the container is capable of holding or hosting a plurality of specimens such that a plurality of specimens may be visualized at the same time, or simultaneously. Optionally, container 110 includes a fixture for holding in place the specimens. Container 110 may take the form of a beaker and may be configured to contain medium or buffer. Container 110, according to some embodiments, is at least partially transparent, substantially transparent, or semi-transparent.

Medium or buffer may be placed in the container. For example, a buffer may facilitate even and efficient distribution of the heat projected from heater 104. The medium or buffer may be any suitable liquid and/or is maintained in a liquid phase during measurement. According to one or more embodiments, the medium or buffer possess a boiling temperature of at least 120° C. For example, at least 100° C., at least 80° C., at least 60° C., or at least 50° C. According to one or more embodiments, the medium or buffer possess a freezing temperature of below −100° C. For example, below −80° C., below −60° C., below −40° C., below −20° C., below −10° C., or below 0° C. Non-limiting examples of medium or buffers contemplated within the present invention, in some embodiments thereof, include an alcohol (such as isopropanol, methanol, ethanol), ethylene glycol and water.

Figure 2:
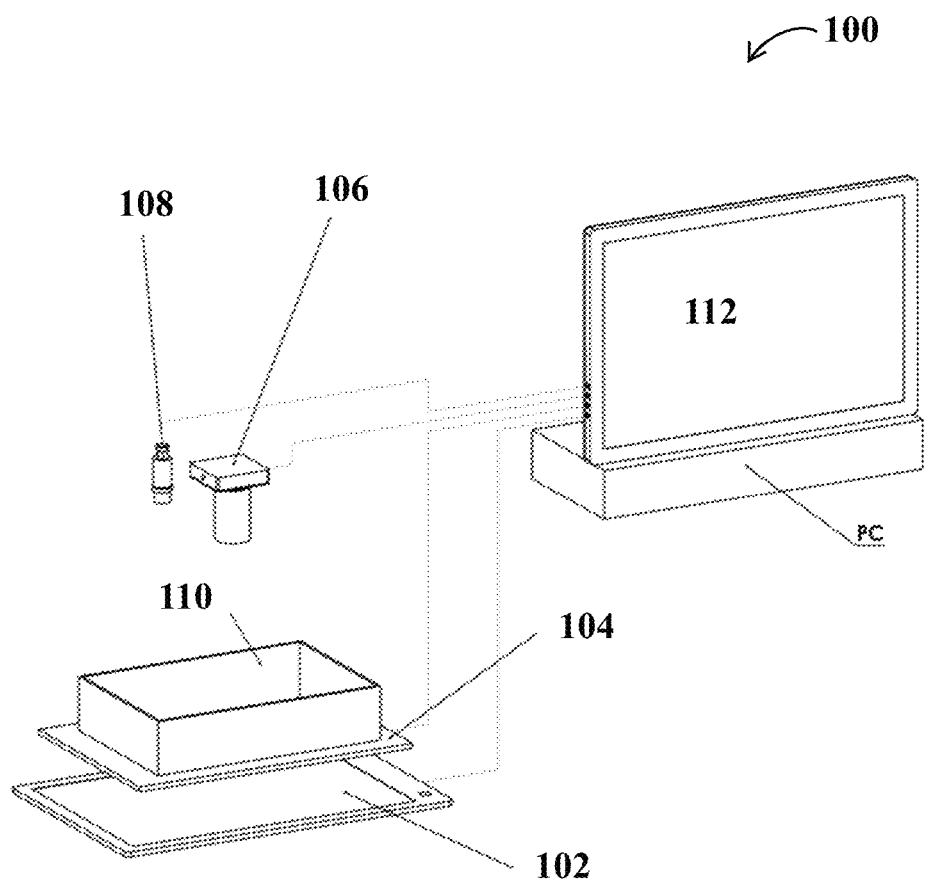
FIG. 2 is a schematic presentation of the apparatus of FIG. 1 which further comprises a computer with a data acquisition system for analyzing an output obtained from the imager; according to some embodiments of the invention.

Attention is now being made to FIG. 2 which shows apparatus 100 of an embodiment of the invention that further comprises a computer 112. Computer 112 is optionally configured to receive data collected by imager 106. Computer 112 may process and/or analyze the data using a suitable data acquisition system or software. For example, signals such as pixels and/or electronic signals are recorded and processed. The results may be combined with the measured temperature. The results may be presented to a user as a raw data, and/or plotted as a curve. For example, the results may show displacement and/or area and/or shape change vs. temperature.

Figure 3:
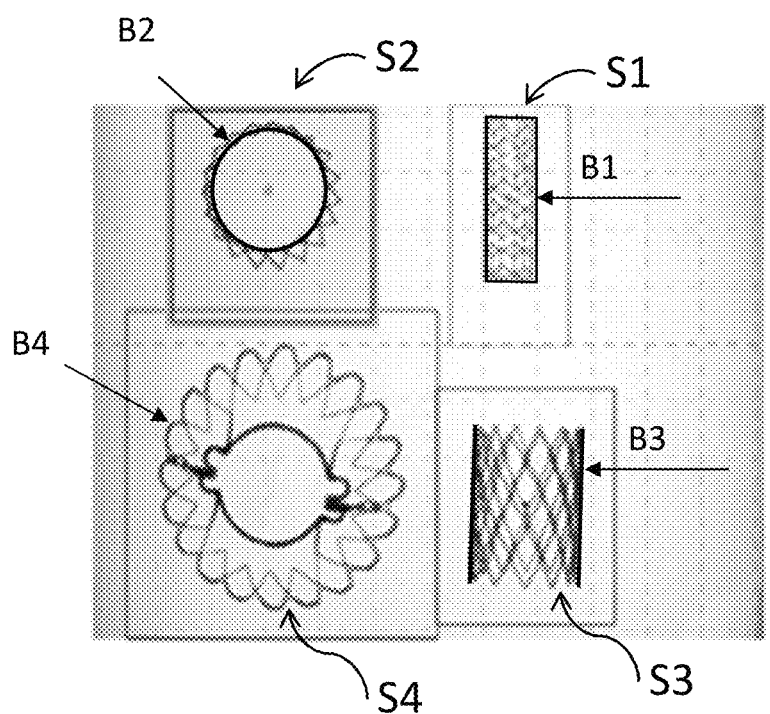
FIG. 3 is an image display, showing a plurality of specimens positioned within a container, according to some embodiments of the invention.

FIG. 3 presents an image display of various examples of tested specimens as presented by computer 112. Optionally, the processing software firstly detects the boundary of each of the specimens placed in the container. For example, for specimen S1 a boundary B1 is drawn. A boundary B2 is drawn for specimen S2, etc. Detected artifacts may be eliminated. For each object, the area of detection for the evaluation, such as inscribed or described boundary is optionally determined prior to initiation of the measurements. For example, a described cylinder boundary B1 is drawn for specimen S1. An inscribed circle boundary B2 is drawn for specimen S2. Described boundaries B3 and B4 were drawn and determined for specimens S3 and S4, respectively.

Figure 4:
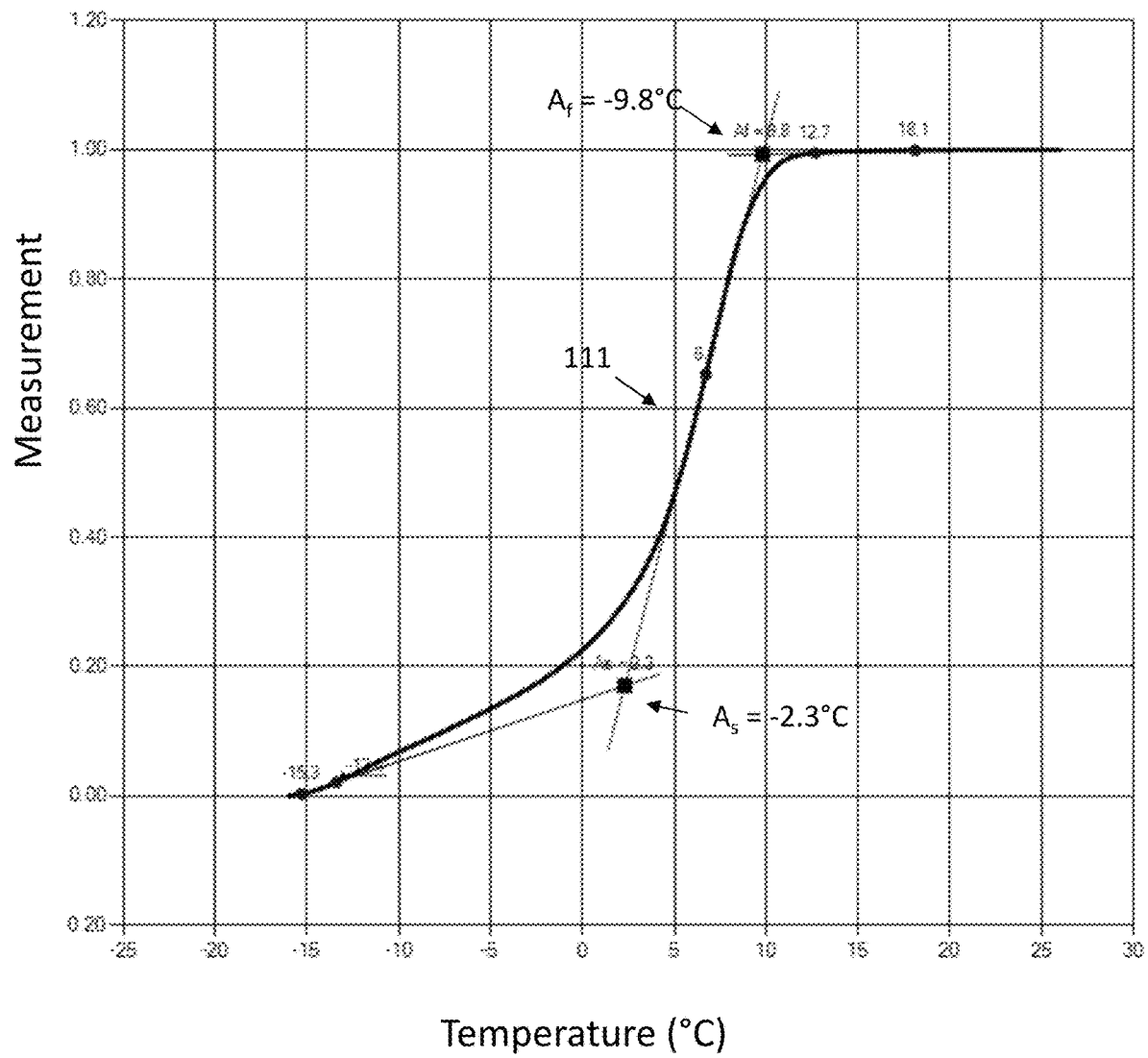
FIG. 4 is a plotted curve showing measurement of change in shape or motion vs. temperature, according to some embodiments of the invention.

FIG. 4 presents an exemplary output produced by computer 112. A curve may show measurement (change in shape) vs. temperature. In FIG. 4 a curve 111 is plotted for a specimen. An exemplary output analysis presented for the tested specimen shows an $A_s$ of −2.3° C. and an $A_f$ of −9.8° C. The Y axis reflects measurement of change in position or structure of a specimen.

Reference is now made to FIGS. 5A-5D showing a schematic presentation of apparatus 200 in accordance with an embodiment of the invention. Similarly, to apparatus 100, apparatus 200 contains a light source 202, a heater 204, an imager 206, and optionally a container 210. As discussed herein above, imager 206 captures, and/or records and/or collects images of the tested specimen. Light source 202 emits light that passes through heater 204. Thus, in one or more embodiments, heater 204 allows passage of light therethrough such that the specimen may be illuminated from light derived from the light source 202 and the imager 206 may record illuminated images of the specimen with no or with minimal reflection. Optionally, the heater 204 allows passage of light therethrough such that the specimen may be illuminated from light derived from the light source 202 that passes through the heater 204. Various possible positions of light source 202 relative to imager 206 are contemplated. Optionally, a line of sight connecting the imager 206 and the light source 202 passes through the container 210 and/or the heater 204, and/or the specimen. In one or more embodiments, a line of sight between the imager 206 to the container 210 or heater 204, or specimen within the container 210 (not shown) intersects a line of sight of the light source 202 to the container 210 and/or the heater 204, and/or specimen at an angle greater than 90°.

In one or more embodiments, an angle in a range of about 100 degrees to about 260 degrees resides between a line of sight of the imager 206 to the container 210, and/or heater 204, and/or specimen and a line of sight of the light source 202 to the container 210 and/or heater 204, and/or specimen. For example, an angle in a range of about 120 degrees to about 240 degrees resides between a line of sight of the imager 206 to the container 210 and/or heater 204, and/or specimen and a line of sight of the light source 202 to the container 210 and/or heater 204, and/or specimen, about 110 degrees to about 220 degrees, about 120 degrees to about 200 degrees, about 140 degrees to about 220 degrees, about 160 degrees to about 240 degrees, about 110 degrees to about 180 degrees, about 120 degrees to about 180 degrees, about 130 degrees to about 180 degrees, about 140 degrees to about 180 degrees, about 150 degrees to about 180 degrees, about 160 degrees to about 180 degrees, about 170 degrees to about 180 degrees, or about 180 degrees. In one exemplary embodiment, an angle of 180 degrees resides between a line of sight of the imager 206 to the container 210 and/or heater 204, and/or specimen and a line of sight of the light source 202 to the container 210, and/or heater 204, and/or specimen. In one exemplary embodiment, the imager 206, the container 210 and/or heater 204 and/or specimen, and the light source 202 reside along a single plain. In one exemplary embodiment, the imager 206, the container 210 and/or heater 204 and/or specimen and the light source 202 are arranged in an axial alignment.

Figure 5A:
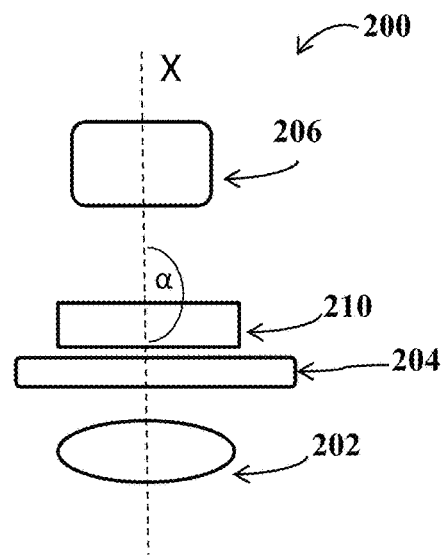
FIGS. 5A-5D are schematic presentations showing possible positions of the imager with respect to the light source, according to some embodiments of the invention.

FIG. 5A presents an exemplary possible scenario wherein a line of sight connecting the imager 206 and the light source 202 passes through the container 210 and/or the heater 204 and/or specimen. An angle α of 180 degrees resides between a line of sight X of the imager 206 to the container 210 and/or heater 204, and/or specimen and a line of sight X of the light source 202 to the container 210 or heater 204, and/or specimen. In this example, light source 202 is disposed below imager 206

Figure 5B:
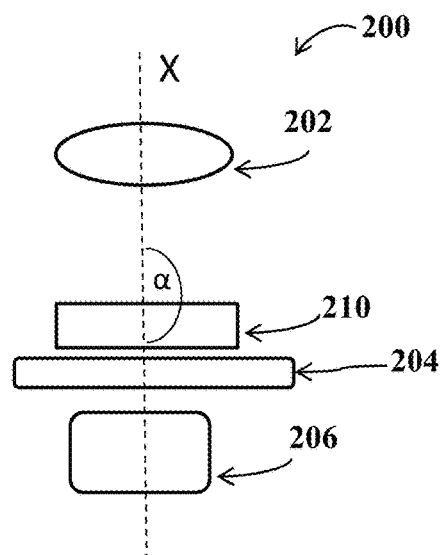

FIG. 5B presents an exemplary possible scenario wherein a line of sight connecting the imager 206 and the light source 202 passes through the container 210 and/or the heater 204, and/or specimen. An angle α of 180 degrees resides between a line of sight X of the imager 206 to the container 210 or heater 204, or specimen and a line of sight X of the light source 202 to the container 210 or heater 204, or specimen. In this example, light source 202 is disposed above imager 206.

Figure 5C:
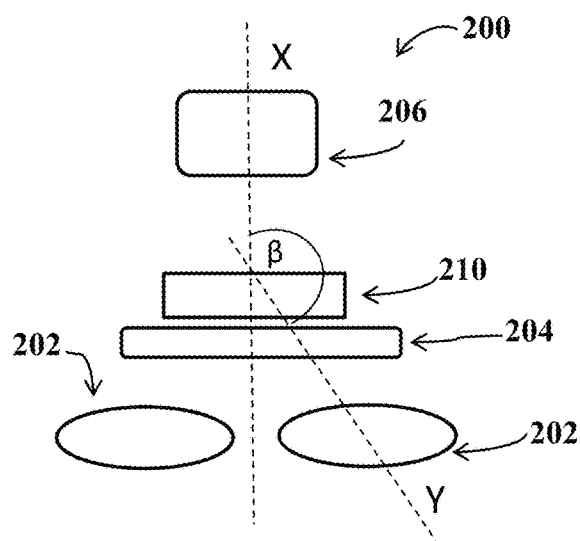

FIG. 5C presents a further exemplary possible scenario wherein a line of sight connecting the imager 206 and the light source 202 passes through the container 210 and/or the heater 204, or specimen. According to one or more embodiments, an angle β of between about 100 degrees to about 170 degrees resides between a line of sight X of the imager 206 to the container 210 or heater 204 or specimen and a line of sight Y of the light source 202 to the container 210 or heater 204 or specimen. For example, angle β is about 120 to about 160 degrees, about 120 to about 170 degrees, about 130 to about 170 degrees, about 140 to about 170 degrees, or about 120 to about 150 degrees. In this example, light source 202 is disposed below imager 206. A plurality of light sources 202 may be contemplated. For example, two or more, three or more, four or more, or five or more light sources 202 may be used.

Figure 5D:
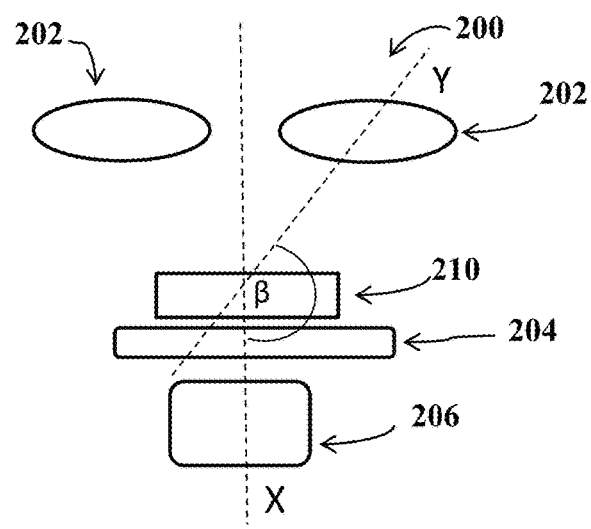

FIG. 5D presents yet a further exemplary possible scenario wherein a line of sight connecting the imager 206 and the light source 202 passes through the container 210 and/or the heater 204, and/or specimen. According to one or more embodiments, an angle β of between about 100 degrees to about 170 degrees resides between a line of sight X of the imager 206 to the container 210 or heater 204 or specimen and a line of sight Y of the light source 202 to the container 210 or heater 204, and/or specimen. For example, angle β is about 120 to about 160 degrees, about 120 to about 170 degrees, about 130 to about 170 degrees, about 140 to about 170 degrees, or about 120 to about 150 degrees. In this example, light source 202 is disposed above imager 206. A plurality of light sources 202 may be contemplated. For example, two or more, three or more, four or more, or five or more light sources 202 may be used.

According to one or more embodiments, the present invention provides a method for measuring or detecting motion of a specimen while changing the temperature. According to one or more embodiments, the present invention provides a method for measuring or detecting area change or shape change of a specimen while changing the temperature. According to one or more embodiments, the present invention provides a method of recording displacement of a specimen while raising temperature. According to one or more embodiments, the present invention provides a method for providing a transition temperature of a specimen(s). According to one or more embodiments, the present invention provides a method of determining the $A_s$ and $A_f$ of a specimen while heating. According to one or more embodiments, the present invention provides a method of determining the transformation temperature or range of temperatures of a shape memory alloy specimen. According to one or more embodiments, the present invention provides a method of determining the martensite to austenite transformation temperature or range of temperatures of a nickel titanium alloy specimen.

According to one or more embodiments, the herein described methods comprise one or more steps, not necessarily in the below order
  providing one or more specimens;
  placing one or more specimens in an apparatus comprising an imager, a heater, optionally a container and a light source;
    heating the one or more specimens using the heater;
    illuminating specimen(s) using the light source;
    capturing images of the specimen(s), while heating, using the imager;
    illuminating the specimens with the light source; and
    evaluating motion and/or area and/or shape change of the specimen(s) relative to temperature from the captured images,
  wherein the heater is at least partially transparent or translucent and allows passage of light therethrough such that the imager capture images illuminated by light derived from the light source that pass through the heater.

Figure 6:
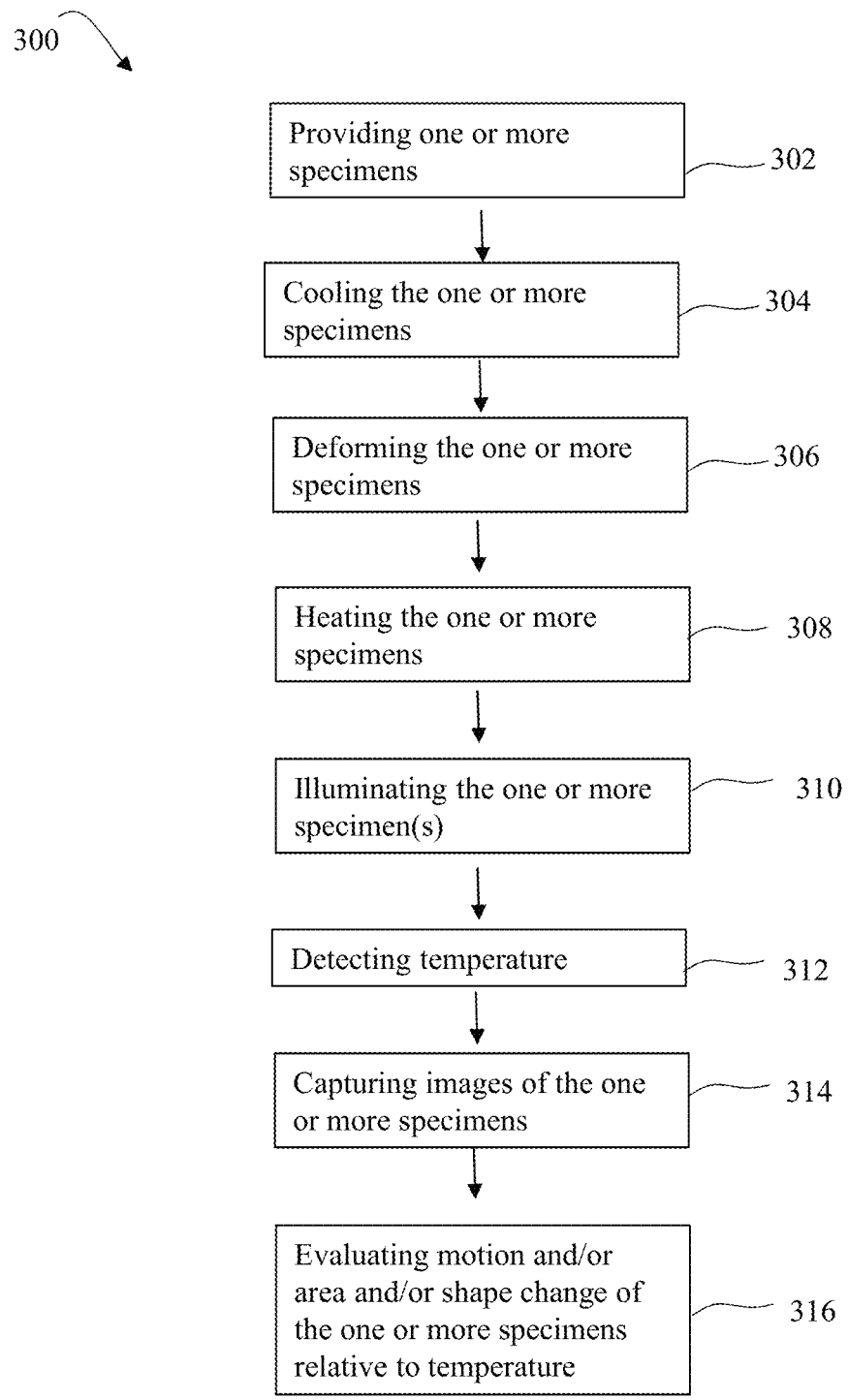
FIG. 6 is a flow chart depicting a method for measuring displacement, according to some embodiments of the invention.

FIG. 6 is a flow chart depicting one or more embodiments of the herein disclosed methods. In step 302 one or more specimens are provided, and optionally placed within an apparatus. For example, the apparatus may comprise a heater that is at least partially transparent or translucent. Optionally, the method further comprises a step 304 of cooling the specimen(s) prior to the measurement or detection. As used herein "cooling" may be performed until a specimen reaches its martensitic phase and/or continue after the specimen reaches the martensitic phase. For example, cooling may be performed to a temperature below the temperature at which a specimen reaches its full martensitic phase. Cooling may be performed, for example, 20° C. below, or 15° C. below, or 10° C. below, or 5° C. below a full martensitic phase temperature of a specimen.

According to one or more embodiments, the method may optionally but not necessarily comprise a step 306 of deforming the specimen(s) prior to the measurement or detection. Deformation may be conducted by any known technique. Deformation may be conducted to a level of about 2% to about 2.5% to minimize effect on the transformation temperature.

At step 308, the specimens are heated, for example, by a heater as herein disclosed. According to one or more embodiments, heating the sample is conducted from below by a heater located below the sample. Heating may be continue until the specimen reaches its austenite phase or further. Heating may be performed to reach a fully annealed specimen. For example, heating may be performed to a temperature above the full austenite phase temperature. heating may be performed, for example, 20° C. above, or 15° C. above, or 10° C. above, or 5° C. above a full austenite phase temperature of a specimen.

According to some embodiments, the rate of heating is controlled and may be adjusted according to the particular specimen and application. The rate of heating may be about 1° C. per minute to about 4° C. per minute.

At step 310, the one or more specimens are illuminated by a light source. The illumination may be performed from above the specimens. Alternatively, the illumination may be performed from below the specimen. In one or more embodiments, the specimen is located in between the imager and the lights source. For example, when the illumination is from above the specimens the images' capturing may be from below the specimens and/or when the illumination is from below the specimens, the images capturing may be from above the specimens.

According to some embodiments, the method of the invention may optionally further comprise a step 312 of detecting the temperature while measuring or detecting motion of the specimen. A temperature sensor may be used for indicating or detecting the change in temperature within the container, or change in temperature within the apparatus or change in temperature of the specimen.

In step 314 images are captured. The images record motion of the specimen throughout the process and especially during heating. Images may be taken at a rate of between once a minute to once every 5 seconds and/or between once every 5 seconds to once every second and/or between once a second to 20 times a second and/or between 20 times a second to 200 times a second. The images may be high enough resolution to detect a change of between 10 to 5% in the size of a specimen and/or between 5% to 1% and/or between 1% to 0.1%. The images may be high enough resolution to detect a change of between 1 mm to 0.1 mm in the size of a specimen and/or between 0.1 mm to 0.01 and/or between 0.01 mm to 0.001 mm.

A further optional step 316 comprises evaluating motion and/or area change and/or shape change, optionally, by providing an output measurement of the captured images and producing a data regarding the transformation temperature or range of temperatures of the specimen, analyzing is conducted using a computer with an appropriate data acquisition system or software.

Several steps associated with analysis using the data acquisition system or software may be effected. According to some embodiments, calibration of the scene wherein the specimens are placed is performed. The scene analysis may be performed, for example by collecting various statistical properties of the scene. The collected data optionally allows detection of the specimen, separation of the specimen from background and/or tracking the specimen in a precise manner.

According to some embodiments, calibration is performed by background to foreground separation. Background to foreground separation and specimen's detection may be conducted by using some very weak and reasonable assumptions on the nature of the scene and the experimental details. As a result, each object is correctly separated from the scene and the other objects.

According to some embodiments, calibration is performed by background and foreground model learning. Background and foreground model learning may be conducted such that each detected experimental object as well as the background is modelled either in a parametric or non-parametric manner. The various objects characteristics, such as object appearance and color, are taken into consideration, and combined in a probabilistic manner. The learned object models are then used for the object shape tracking and shape change registration.

According to some embodiments, refinement may be further conducted by an additional validation round for example to increase the reliability of the analysis.

According to some embodiments, analysis of the specimen tested comprises collecting data regarding the change in shape of each specimen. According to some embodiments, the method of the invention affords measuring changes in shape such as change in area occupied by the specimen.

According to some embodiments, analysis using the data acquisition system or software may comprise determining a boundary for each specimen. Boundary may be inscribed (i.e., an internal boundary) or described (i.e., an external boundary). The boundary for each specimen may be a geometric pattern or structure (such as a circle, or a rectangle) or lines (such as parallel lines).

According to some embodiments, following collection of the images the measurements are organized and analyzed. The analysis may comprise filtering measurement outliers, fitting the characteristic curves and finding the points of interest on that curves. For example, the temperatures of start and finish in change in shape (or area) may be determined. According to some embodiments, the rate of change in area may also be evaluated.

According to some embodiments, the herein disclosed method is capable of producing an accurate motion or displacement measurement for a specimen having weight less than 3 grams.

Each of the following terms: 'includes', 'including', 'has', 'having', 'comprises', and 'comprising', and, their linguistic/grammatical variants, derivatives, or/and conjugates, as used herein, means 'including, but not limited to', and is to be taken as specifying the stated component(s), feature(s), characteristic(s), parameter(s), integer(s), or step (s), and does not preclude addition of one or more additional component(s), feature(s), characteristic(s), parameter(s), integer(s), step(s), or groups thereof. Each of these terms is considered equivalent in meaning to the phrase 'consisting essentially of'.

Each of the phrases 'consisting of' and 'consists of', as used herein, means 'including and limited to'.

Throughout this disclosure, a numerical value of a parameter, feature, characteristic, object, or dimension, may be stated or described in terms of a numerical range format. Such a numerical range format, as used herein, illustrates implementation of some exemplary embodiments of the invention, and does not inflexibly limit the scope of the exemplary embodiments of the invention. Accordingly, a stated or described numerical range also refers to, and encompasses, all possible sub-ranges and individual numerical values (where a numerical value may be expressed as a whole, integral, or fractional number) within that stated or described numerical range. For example, a stated or described numerical range 'from 1 to 6' also refers to, and encompasses, all possible sub-ranges, such as 'from 1 to 3', 'from 1 to 4', 'from 1 to 5', 'from 2 to 4', 'from 2 to 6', 'from 3 to 6', etc., and individual numerical values, such as '1', '1.3', '2', '2.8', '3', '3.5', '4', '4.6', '5', '5.2', and '6', within the stated or described numerical range of 'from 1 to 6'. This applies regardless of the numerical breadth, extent, or size, of the stated or described numerical range.

The term 'about', as used herein, refers to ±10% of the stated numerical value.

It is to be fully understood that certain aspects, characteristics, and features, of the invention, which are, for clarity, illustratively described and presented in the context or format of a plurality of separate embodiments, may also be illustratively described and presented in any suitable combination or sub-combination in the context or format of a single embodiment. Conversely, various aspects, characteristics, and features, of the invention which are illustratively described and presented in combination or sub combination in the context or format of a single embodiment, may also be illustratively described and presented in the context or format of a plurality of separate embodiments.

Although the invention has been described in conjunction with specific embodiments thereof, it is evident that many alternatives, modifications, and variations will be apparent to those skilled in the art. Accordingly, it is intended to embrace all such alternatives, modifications, and variations that fall within the spirit and broad scope of the appended claims.

All publications, patents, and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

The invention claimed is:

1. An apparatus for measuring the phase transition temperature of one or more specimens, the apparatus comprising
a container for accommodating one or more specimens;
at least one light source for illuminating the one or more specimens;
an imager configured to capture one or more images of said one or more specimens; and
a heater that is at least partially transparent or translucent located on a line of sight between said at least one light source and said imager, the heater configured to heat the one or more specimens in the container.

2. The apparatus according to claim 1, wherein the heater is disposed below the container and the light source is positioned below the heater such to allow illuminating the one or more specimens from below through the heater.

3. The apparatus according to claim 1, wherein the container, the heater, the light source, and the imager are disposed in a closed chamber.

4. The apparatus according to claim 1, wherein the container is configured to accommodate a liquid having a freezing point of about or below about 0° C. and a boiling temperature above about 100° C.

5. The apparatus according to claim 1, wherein the heater is configured to gradually heat the one or more specimens at a rate of between about 1° C. to about 4° C. per minute.

6. The apparatus according to claim 1, further comprising a temperature sensor for detecting a temperature change of the one or more specimens.

7. The apparatus according to claim 1, wherein the one or more specimens include a structure comprising one or more wires, and/or strips.

8. The apparatus of claim 1, wherein the one or more specimens include a shape memory alloy.

9. The apparatus according to claim 1, which is capable of producing an accurate displacement measurement versus temperature for specimens having weight less than about 3 grams.

10. The apparatus according to claim 1, configured to measure a phase transition temperature of a plurality of said one or more specimens.

11. The apparatus according to claim 1, wherein an angle in a range of about 100 degrees to about 260 degrees resides between a line of sight of the imager to the container and/or the heater and/or the one or more specimens and a line of sight of the light source to the container and/or the heater and/or the one or more specimens.

12. The apparatus according to claim 11, wherein an angle of about 180 degrees resides between the line of sight of the imager to the container and/or the heater and/or the one or more specimens and the line of sight of the light source to the container and/or the heater and/or the one or more specimens.

13. The apparatus according to claim 1, wherein the light source comprises one or more diffuse lamps.

14. The apparatus according to claim 13, wherein the diffuse lamps comprise one or more led lamps.

15. The apparatus according to claim 1, wherein the imager comprises a digital camera configured to provide captured images of the one or more specimens.

16. The apparatus according to claim 15, further comprising data acquisition means configured to analyze said images and to produce data regarding the phase transition temperature of said one or more specimens.

17. The apparatus according to claim 1, wherein the heater comprises a glass plate coated with a conductive film.

18. The apparatus according to claim 17, wherein the conductive film comprises indium tin oxide (ITO).

19. The apparatus according to claim 17, wherein the conductive film is at least partially transparent or translucent.

20. A method for measuring the phase transition temperature of one or more specimens, the method comprising the steps of
providing an apparatus comprising a container, at least one light source, an imager, and a heater that is at least partially transparent or translucent;
placing one or more specimen(s) within the container;
heating the one or more specimen(s) using the heater;
illuminating said specimen(s) using the at least one light source;
capturing images of said specimen(s) using the imager; and
evaluating motion and/or change in area and/or change of shape of the one or more specimen(s) in response to said heating;
thereby measuring the phase transition temperature of the one or more specimen(s).

* * * * *